USOO9489752B2

(12) United States Patent
Kim et al.

(10) Patent No.: US 9,489,752 B2
(45) Date of Patent: Nov. 8, 2016

(54) ORDERED SUBSETS WITH MOMENTUM FOR X-RAY CT IMAGE RECONSTRUCTION

(71) Applicants: General Electric Company, Schenectady, NY (US); The Regents of the University of Michigan, Ann Arbor, MI (US)

(72) Inventors: Donghwan Kim, Ann Arbor, MI (US); Sathish Ramani, Ann Arbor, MI (US); Jeffrey A. Fessler, Ann Arbor, MI (US); Lin Fu, Niskayuna, NY (US); Bruno Kristiaan Bernard De Man, Clifton Park, NY (US)

(73) Assignee: General Electric Company, Niskayuna, NY (US)

(*) Notice: Subject to any disclaimer, the term of this patent is extended or adjusted under 35 U.S.C. 154(b) by 85 days.

(21) Appl. No.: 14/045,816

(22) Filed: Oct. 4, 2013

(65) Prior Publication Data

US 2014/0140599 A1 May 22, 2014

Related U.S. Application Data

(60) Provisional application No. 61/728,909, filed on Nov. 21, 2012.

(51) Int. Cl.
G06T 11/00 (2006.01)
G06K 9/00 (2006.01)

(52) U.S. Cl.
CPC ........ G06T 11/006 (2013.01); G06T 2211/424 (2013.01)

(58) Field of Classification Search
None
See application file for complete search history.

(56) References Cited

U.S. PATENT DOCUMENTS

| 6,744,845 | B2 | 6/2004 | Harding et al. | |
|---|---|---|---|---|
| 7,042,976 | B2 | 5/2006 | Tsujii | |
| 7,386,088 | B2 * | 6/2008 | Deman | G06T 11/006 378/4 |
| 7,623,616 | B2 | 11/2009 | Ziegler et al. | |
| 7,711,086 | B2 | 5/2010 | Harding | |
| 7,924,978 | B2 | 4/2011 | Harding | |
| 7,937,131 | B2 | 5/2011 | Cho et al. | |
| 8,063,379 | B2 | 11/2011 | Suhami | |
| 8,116,848 | B2 | 2/2012 | Shahidi | |
| 2008/0095300 | A1 * | 4/2008 | Zingelewicz | G01N 23/04 378/4 |
| 2009/0060124 | A1 | 3/2009 | Grass et al. | |
| 2009/0112530 | A1 * | 4/2009 | Vija | G06T 11/006 703/2 |
| 2009/0161933 | A1 * | 6/2009 | Chen | G06T 11/006 382/131 |
| 2009/0245458 | A1 | 10/2009 | Van Stevendaal et al. | |
| 2010/0054394 | A1 * | 3/2010 | Thibault | G06T 11/006 378/8 |
| 2011/0164031 | A1 * | 7/2011 | Shi | G06T 11/006 345/419 |
| 2012/0020448 | A1 * | 1/2012 | Khare | G06T 11/006 378/4 |
| 2012/0128265 | A1 * | 5/2012 | Silver | G06T 11/006 382/275 |
| 2012/0155730 | A1 * | 6/2012 | Metaxas | G01R 33/5608 382/131 |
| 2013/0320974 | A1 * | 12/2013 | Liu | G01R 33/4818 324/309 |

OTHER PUBLICATIONS

S Ahn, JA Fessler, D Blatt, and AO Hero, "Convergent Incremental Optimization Transfer Algorithms: Application to Tomography," IEEE Trans. Med. Imag., vol. 25, No. 3, Mar. 2006.*
B De Man and JA Fessler, "Statistical Iterative Reconstruction for X-Ray Computed Tomography," Biomedical Mathematics: Promising Directions in Imaging, Therapy Planning and Inverse Problems, pp. 113-140. Medical Physics Publishing, Madison, WI, Jun. 30, 2010. ISBN: 9781930524484.*
A Chambolle and T Pock, "A First-Order Primal-Dual Algorithm for Convex Problems with Applications to Imaging," J Math Imaging Vis (2011) 40:120-145.*

* cited by examiner

Primary Examiner — Matthew Bella
Assistant Examiner — Soo Shin
(74) Attorney, Agent, or Firm — Pabitra K. Chakrabarti

(57) ABSTRACT

Methods, systems, and non-transitory computer readable media for image reconstruction are presented. Measured data corresponding to a subject is received. A preliminary image update in a particular iteration is determined based on one or more image variables computed using at least a subset of the measured data in the particular iteration. Additionally, at least one momentum term is determined based on the one or more image variables computed in the particular iteration and/or one or more further image variables computed in one or more iterations preceding the particular iteration. Further, a subsequent image update is determined using the preliminary image update and the momentum term. The preliminary image update and/or the subsequent image update are iteratively computed for a plurality of iterations until one or more termination criteria are satisfied.

20 Claims, 6 Drawing Sheets

ORDERED SUBSETS WITH MOMENTUM FOR X-RAY CT IMAGE RECONSTRUCTION

CROSS REFERENCE TO RELATED APPLICATIONS

This non-provisional application relates to and claims the benefit of priority under 35 U.S.C. §119(e) to U.S. Provisional Patent Application Ser. No. 61/728,909, filed Nov. 21, 2012, which is herein incorporated in its entirety by reference.

STATEMENT OF GOVERNMENT INTEREST

This invention was made with government support under 1-R01-HL-098686 awarded by National Institutes of Health. The government has certain rights in the invention.

BACKGROUND

Embodiments of the present disclosure relate generally to diagnostic imaging, and more particularly to methods and systems for fast and iterative image reconstruction.

Non-invasive imaging techniques are widely used in diagnostic imaging applications such as security screening, quality control, and medical imaging systems. Particularly, in medical imaging, non-invasive imaging techniques such as computed tomography (CT) are used for unobtrusive, convenient, and fast imaging of underlying tissues and organs. Some CT systems employ direct reconstruction techniques such as filtered back-projection (FBP) that allow reconstruction of a three-dimensional (3D) image data set in a single reconstruction step. Thus, the direct reconstruction techniques are generally fast and computationally efficient.

Alternatively, some CT systems employ iterative reconstruction techniques that iteratively update a reconstructed image volume. Typically, the iterative reconstruction techniques are employed to provide greater flexibility in imaging applications than available when using the direct reconstruction techniques. Specifically, the iterative reconstruction techniques find use in imaging applications that entail selective and/or interactive enhancement of imaging metrics and/or protocols based on specific requirements. For example, the iterative reconstruction techniques provide greater flexibility in configuring acquisition geometry and/or modeling physical effects to improve one or more imaging metrics such as reducing radiation dose, noise, and/or other imaging artifacts.

Iterative reconstruction techniques, however, involve long and complex computations that are generally much slower than the direct reconstruction techniques. Certain techniques have been proposed for reducing computational costs of iterative reconstruction, for example, using ordered subsets (OS) or relaxation factors. OS algorithms, in particular, are used in CT imaging to accelerate image reconstruction by using only a subset of measured projection data in each image update. Although, using only a subset of the measured projection data in the OS algorithms entails approximations, the OS algorithms provide dramatic initial acceleration. Such conventional OS algorithms, however, still employ a number of iterations to converge and involve long computations, thus limiting use of the OS algorithms in clinical settings.

BRIEF DESCRIPTION

In accordance with aspects of the present disclosure, methods, systems, and non-transitory computer readable media for image reconstruction are presented. Measured data corresponding to a subject is received. A preliminary image update in a particular iteration is determined based on one or more image variables computed using at least a subset of the measured data in the particular iteration. Additionally, at least one momentum term is determined based on the one or more image variables computed in the particular iteration and/or one or more further image variables computed in one or more iterations preceding the particular iteration. Further, a subsequent image update is determined using the preliminary image update and the momentum term. The preliminary image update and/or the subsequent image update are iteratively computed for a plurality of iterations until one or more termination criteria are satisfied.

DRAWINGS

These and other features, aspects, and embodiments of the present disclosure will become better understood when the following detailed description is read with reference to the accompanying drawings in which like characters represent like parts throughout the drawings, wherein.

Figure 5:
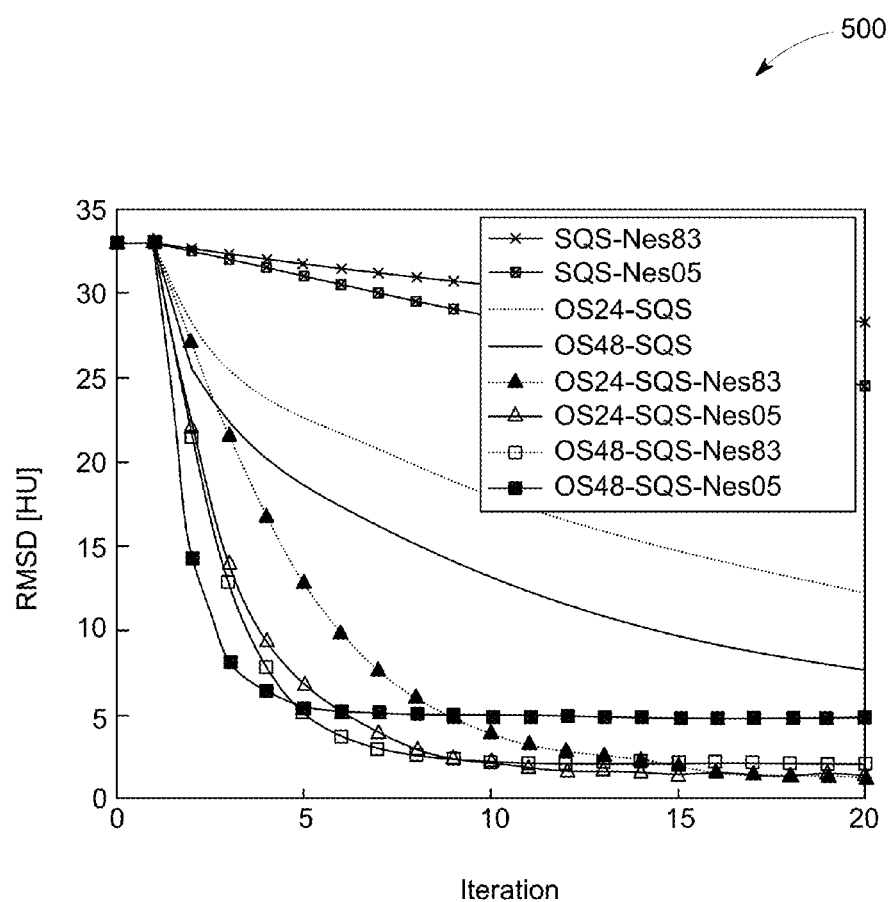
Figure 6:
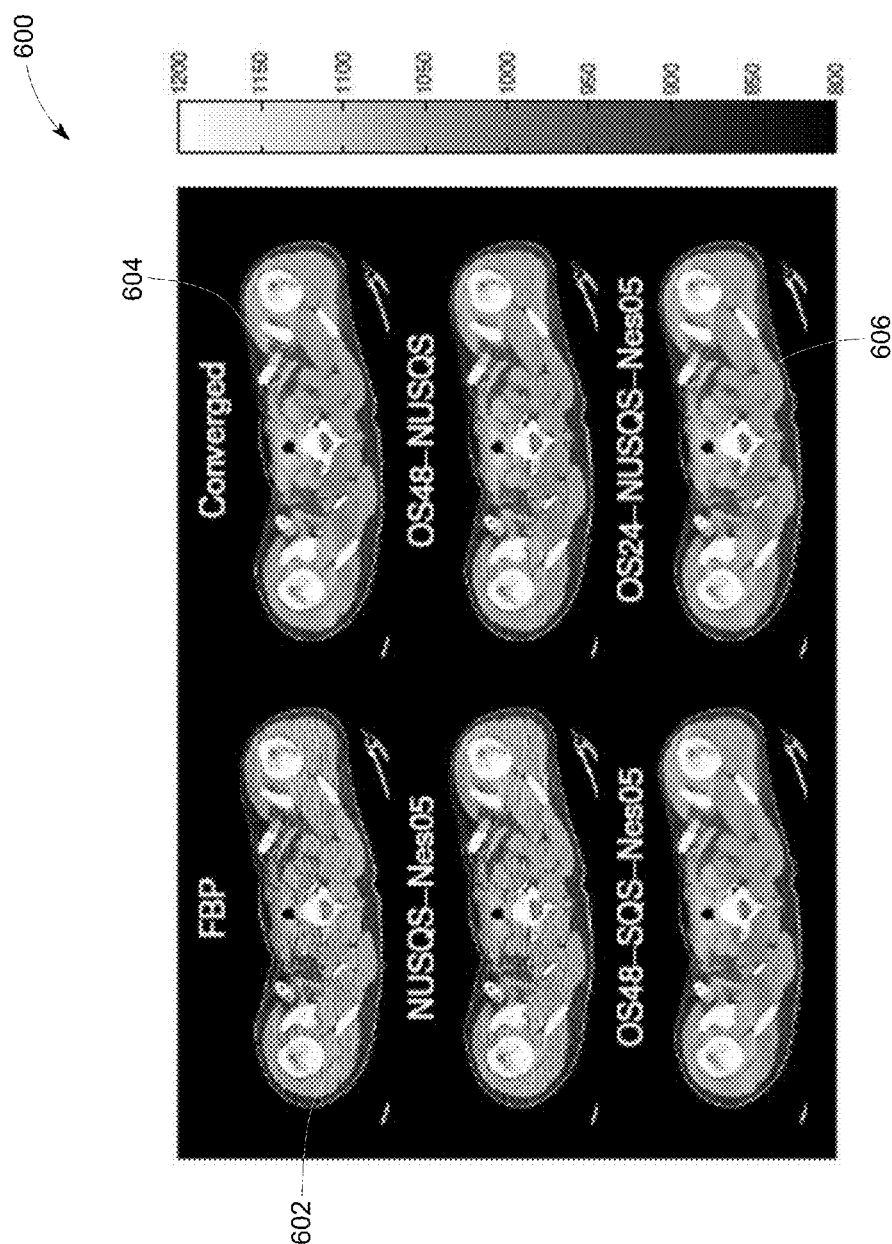

FIG. 5 is another graphical representation depicting exemplary convergence rates of certain image reconstruction methods with and without use of momentum, in accordance with aspects of the present disclosure; and FIG. 6 is a diagrammatical representation depicting examples of initial images and corresponding converged images that are reconstructed using conventional methods and an embodiment of the present method described with reference to FIG. 3, in accordance with aspects of the present disclosure.

DETAILED DESCRIPTION

The following description presents systems and methods for fast and iterative image reconstruction. Particularly, certain embodiments illustrated herein describe methods and systems for faster convergence of iterative image reconstruction using OS and momentum. As used herein, the term "momentum" may be used to refer to information derived from one or more previous iterations that may be used in computations corresponding to a current iteration for accelerating convergence of the iterative image reconstruction, particularly in the early iterations.

Although the following description describes embodiments for fast and iterative image reconstruction in the context of medical diagnostic imaging using a CT system, the present disclosure may be implemented in various other medical imaging systems and applications. Some of these systems may include an X-ray system, a positron emission tomography (PET) scanner, a PET-CT scanner, a single photon emission computed tomography (SPECT) scanner, a SPECT-CT scanner, an X-ray tomosynthesis system, and/or an MR-CT scanner.

In addition to medical diagnostic imaging, embodiments of the present disclosure may also be employed in other non-invasive imaging contexts to generate images with minimal processing and memory utilization. By way of example, embodiments of the present disclosure may be used in baggage screening, and/or industrial nondestructive evaluation of manufactured parts. An exemplary environment that is suitable for practicing various implementations of the present disclosure will be discussed in the following sections with reference to FIGS. 1 and 2.

Figure 1:
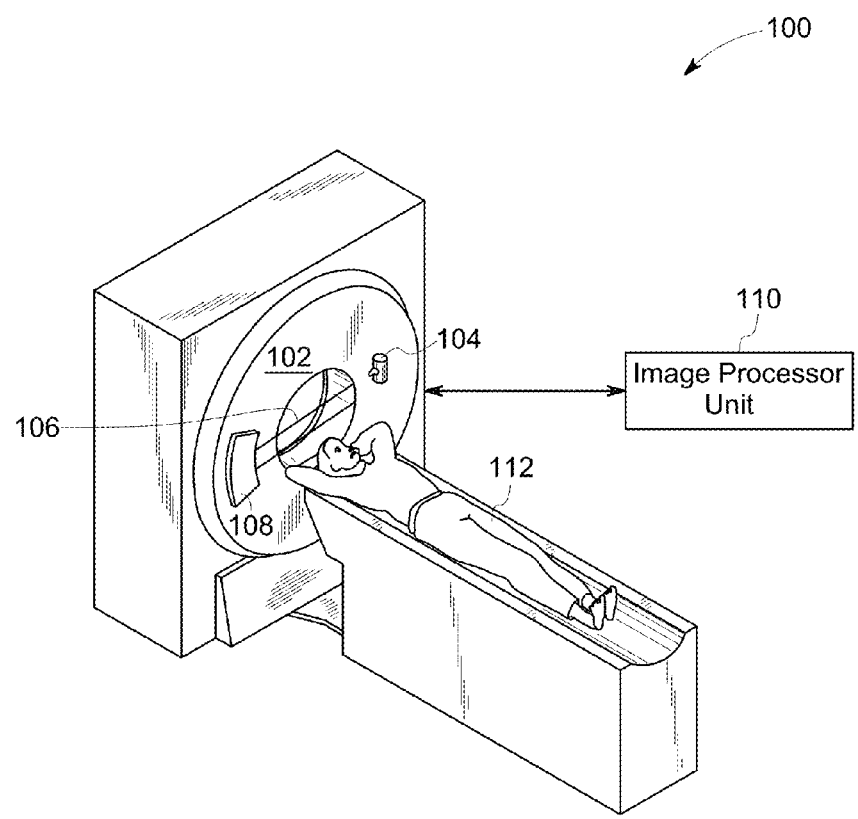
FIG. 1 is a diagrammatical view of a CT system, in accordance with aspects of the present disclosure.

FIG. 1 illustrates an exemplary CT system 100 configured to allow fast and iterative image reconstruction. Particularly, the CT system 100 is configured to image a subject such as a patient, an inanimate object, one or more manufactured parts, and/or foreign objects such as dental implants, stents, and/or contrast agents present within the body. In one embodiment, the CT system 100 includes a gantry 102, which in turn, may further include at least one X-ray radiation source 104 configured to project a beam of X-ray radiation 106 for use in imaging the patient. Specifically, the radiation source 104 is configured to project the X-rays 106 towards a detector array 108 positioned on the opposite side of the gantry 102. Although, FIG. 1 depicts only a single radiation source 104, in certain embodiments, multiple radiation sources may be employed to project a plurality of X-rays 106 for acquiring projection data corresponding to the patient at different energy levels.

In certain embodiments, the CT system 100 further includes an image processing unit 110 configured to reconstruct images of a target volume of the patient using an iterative reconstruction method. In accordance with aspects of the present disclosure, the CT system 100 performs an OS-based iterative reconstruction using momentum to substantially accelerate the convergence of the OS-based iterative image reconstruction without any significant sacrifice to image quality. The fast and accurate image reconstruction reduces scanning time and radiation dose, while also allowing for early diagnosis and/or treatment of the patient. Another exemplary embodiment of an imaging system that allows for faster image reconstruction using the OS-based iterative reconstruction aided by momentum will be described in greater detail with reference to FIG. 2.

Figure 2:
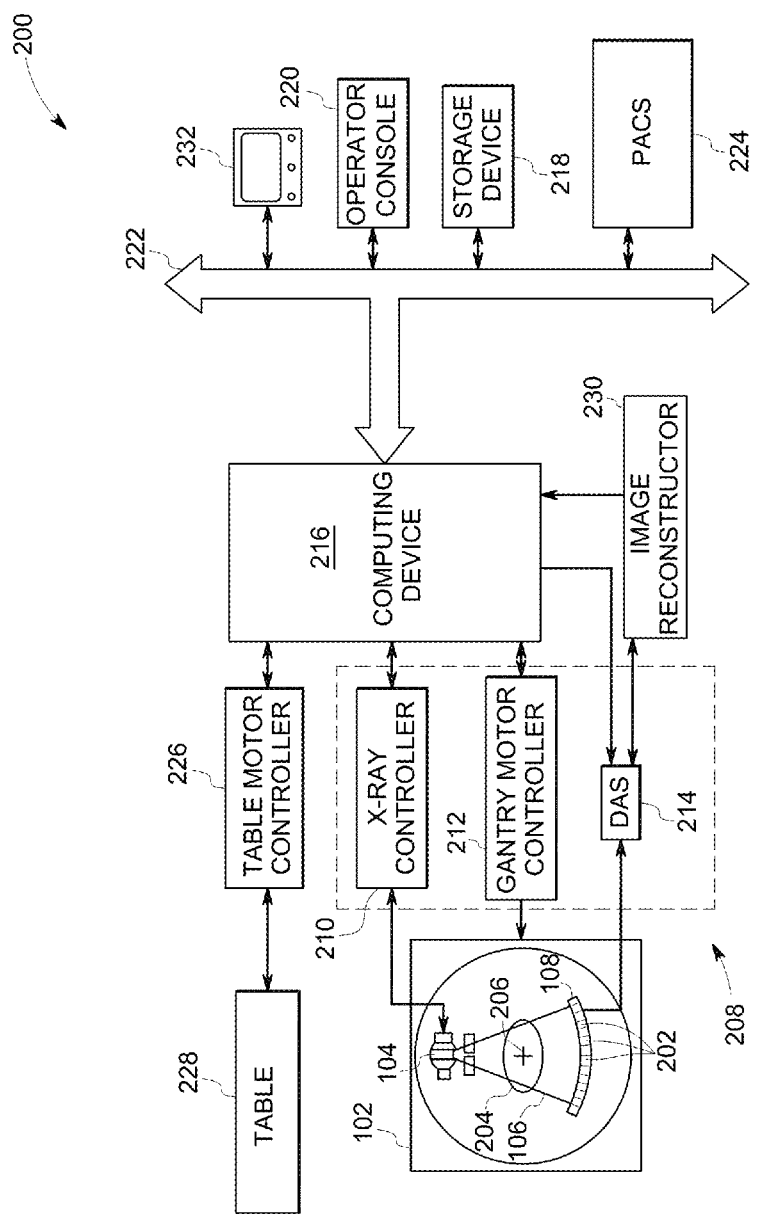
FIG. 2 is a block schematic diagram of an exemplary imaging system, in accordance with aspects of the present disclosure.

FIG. 2 illustrates an exemplary imaging system 200 similar to the CT system 100 of FIG. 1. In accordance with aspects of the present disclosure, the system 200 is configured to substantially accelerate iterative reconstruction of one or more images using OS and momentum. In one embodiment, the system 200 includes the detector array 108 (see FIG. 1). The detector array 108 further includes a plurality of detector elements 202 that together sense the X-ray beams 106 (see FIG. 1) that pass through a subject 204 such as a patient to acquire corresponding projection data. Accordingly, in one embodiment, the detector array 108 is fabricated in a multi-slice configuration including the plurality of rows of cells or detector elements 202. In such a configuration, one or more additional rows of the detector elements 202 are arranged in a parallel configuration for acquiring the projection data.

In certain embodiments, the system 200 is configured to traverse different angular positions around the subject 204 for acquiring desired projection data. Accordingly, the gantry 102 and the components mounted thereon may be configured to rotate about a center of rotation 206 for acquiring the projection data, for example, at different energy levels. Alternatively, in embodiments where a projection angle relative to the subject 204 varies as a function of time, the mounted components may be configured to move along a general curve rather than along a segment of a circle.

In one embodiment, the system 200 includes a control mechanism 208 to control movement of the components such as rotation of the gantry 102 and the operation of the X-ray radiation source 104. In certain embodiments, the control mechanism 208 further includes an X-ray controller 210 configured to provide power and timing signals to the radiation source 104. Additionally, the control mechanism 208 includes a gantry motor controller 212 configured to control a rotational speed and/or position of the gantry 102 based on imaging requirements.

In certain embodiments, the control mechanism 208 further includes a data acquisition system (DAS) 214 configured to sample analog data received from the detector elements 202 and convert the analog data to digital signals for subsequent processing. The data sampled and digitized by the DAS 214 is transmitted to a computing device 216. In one example, the computing device 216 stores the data in a storage device 218. The storage device 218, for example, may include a hard disk drive, a floppy disk drive, a compact disk-read/write (CD-R/W) drive, a Digital Versatile Disc (DVD) drive, a flash drive, and/or a solid-state storage device.

Additionally, the computing device 216 provides commands and parameters to one or more of the DAS 214, the X-ray controller 210, and the gantry motor controller 212 for controlling system operations such as data acquisition and/or processing. In certain embodiments, the computing device 216 controls system operations based on operator input. The computing device 216 receives the operator input, for example, including commands and/or scanning parameters via an operator console 220 operatively coupled to the computing device 216. The operator console 220 may include a keyboard (not shown) or a touchscreen to allow the operator to specify the commands and/or scanning parameters.

Although FIG. 2 illustrates only one operator console 220, more than one operator console may be coupled to the system 200, for example, for inputting or outputting system parameters, requesting examinations and/or viewing images. Further, in certain embodiments, the system 200 may be coupled to multiple displays, printers, workstations, and/or similar devices located either locally or remotely, for example, within an institution or hospital, or in an entirely different location via one or more configurable wired and/or wireless networks 222 such as the Internet and/or virtual private networks.

In one embodiment, for example, the system 200 either includes, or is coupled to a picture archiving and communications system (PACS) 224. In an exemplary implementation, the PACS 224 is further coupled to a remote system such as a radiology department information system, hospital information system, and/or to an internal or external network (not shown) to allow operators at different locations to supply commands and parameters and/or gain access to the image data.

The computing device 216 uses the operator supplied and/or system defined commands and parameters to operate a table motor controller 226, which in turn, may control a motorized table 228. Particularly, the table motor controller 226 moves the table 228 for appropriately positioning the subject 204 in the gantry 102 for acquiring projection data corresponding to the target volume of the subject 204.

As previously noted, the DAS 214 samples and digitizes the projection data acquired by the detector elements 202.

Subsequently, an image reconstructor 230 uses the sampled and digitized X-ray data to perform high-speed reconstruction. Although, FIG. 2 illustrates the image reconstructor 230 as a separate entity, in certain embodiments, the image reconstructor 230 may form part of the computing device 216. Alternatively, the image reconstructor 230 may be absent from the system 200 and instead the computing device 216 may perform one or more functions of the image reconstructor 230. Moreover, the image reconstructor 230 may be located locally or remotely, and may be operatively connected to the system 100 using a wired or wireless network. Particularly, one exemplary embodiment may use computing resources in a "cloud" network cluster for the image reconstructor 230.

Typically, iterative image reconstruction algorithms are implemented by forming an objective or cost function that incorporates an accurate system model, statistical noise model, and/or prior model. The image is then reconstructed by computing an estimate that minimizes the resulting cost function. Various algorithms may be used for minimizing the cost function. For example, sequential algorithms, such as iterative coordinate descent (ICD), may be employed as these have fast convergence rates if given a good initial estimate. However, the sequential algorithms entail column access to a system matrix and have relatively large computation cost per iteration. Simultaneous algorithms, such as gradient-based methods used with various surrogate functions may provide a higher level of parallelism. However, standard parallelizable algorithms may converge slowly and may require excessive computation to produce a useful image.

Accordingly, several approaches have been proposed to accelerate simultaneous algorithms. Particularly, in a presently contemplated embodiment, the image reconstructor 230 performs iterative image reconstruction using OS and momentum. An OS-based iterative image reconstruction uses only a subset of the projection data per image update or sub-iteration. Accordingly, the measured data is divided into M subsets and each sub-iteration computes an update using only one subset of the data, thereby substantially reducing the computational effort and/or memory access involved in the iterative image reconstruction. Furthermore, use of one or more momentum terms, for example, derived using Nesterov's algorithms accelerates the OS-based iterative image reconstruction towards a desired optimum.

Particularly, in one embodiment, the image reconstructor 230 combines the OS-based iterative image reconstruction with momentum terms to aid in achieving a convergence rate of $O(1/(Mk)^2)$ in early iterations, where k counts the number of iterations and M denotes the number of subsets. More specifically, the convergence rate of $O(1/(Mk)^2)$ may be achieved by combining OS-based iterative image reconstruction, for example, with Nesterov's momentum terms. In contrast, the convergence rate of the conventional OS-based iterative reconstruction is only $O(1/(Mk))$ in early iterations. In certain embodiments, the image reconstructor 230 further combines separable quadratic surrogates (SQS) and/or a non-uniform (NU) surrogate approach with momentum terms to allow for faster convergence even with a relatively small number of subsets.

In one embodiment, the image reconstructor 230 stores the images reconstructed using the OS-based iterative image reconstruction with the momentum terms in the storage device 218. Alternatively, the image reconstructor 230 transmits the reconstructed images to the computing device 216 for generating useful patient information for diagnosis and evaluation. In certain embodiments, the computing device 216 transmits the reconstructed images and/or the patient information to a display 232 communicatively coupled to the computing device 216 and/or the image reconstructor 230.

In one embodiment, the display 232 allows the operator to evaluate the imaged anatomy. The display 232 may also allow the operator to select a volume of interest (VOI) and/or request patient information, for example, via graphical user interface (GUI) for a subsequent scan or processing. Further, the system 200 performs the iterative image reconstruction using projection data acquired from the selected VOI using a combination of OS methods with momentum terms. In one example, the momentum terms may be similar to the terms derived by Nesterov for general optimization problems that do not employ OS. An exemplary embodiment describing a method for fast iterative image reconstruction using OS and momentum will be described in greater detail with reference to FIG. 3.

Figure 3:
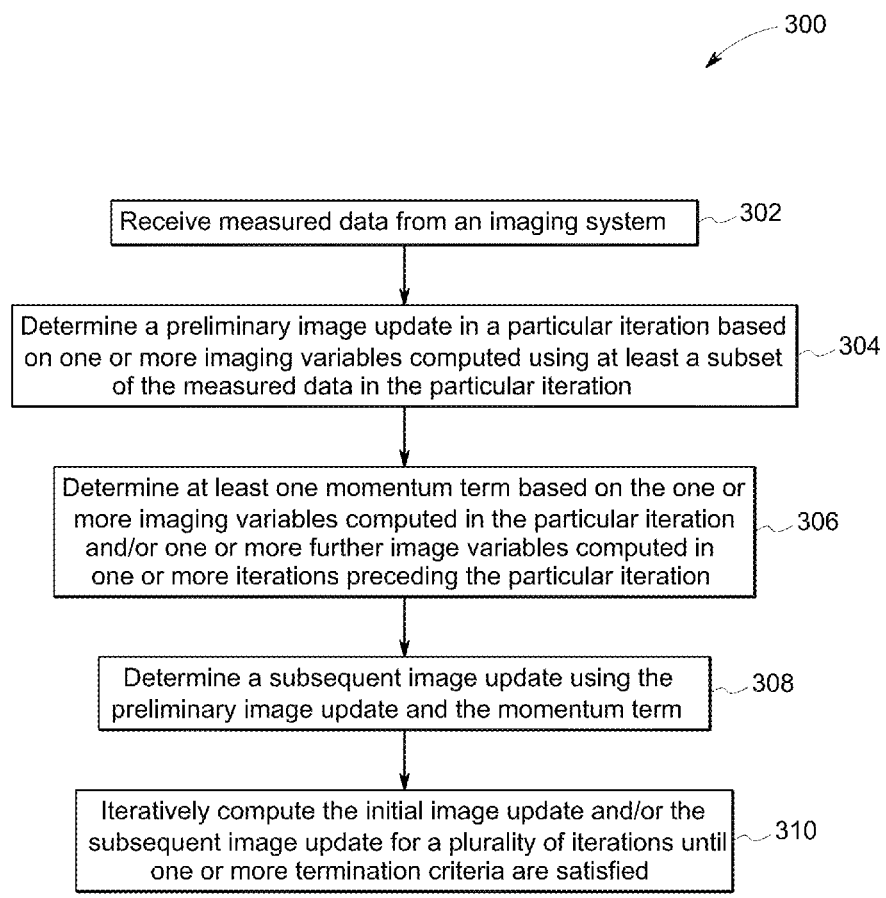
FIG. 3 is a flow chart depicting an exemplary iterative image reconstruction method, in accordance with aspects of the present disclosure.

FIG. 3 illustrates a flow chart 300 depicting an exemplary iterative image reconstruction method using OS and momentum. In the present disclosure, embodiments of the exemplary method may be described in a general context of computer executable instructions on a computing system or a processor. Generally, computer executable instructions may include routines, programs, objects, components, data structures, procedures, modules, functions, and the like that perform particular functions or implement particular abstract data types.

Additionally, embodiments of the exemplary method may also be practiced in a distributed computing environment where optimization functions are performed by remote processing devices that are linked through a wired and/or wireless communication network. In the distributed computing environment, the computer executable instructions may be located in both local and remote computer storage media, including memory storage devices.

Further, in FIG. 3, the exemplary method is illustrated as a collection of blocks in a logical flow chart, which represents operations that may be implemented in hardware, software, or combinations thereof. The various operations are depicted in the blocks to illustrate the functions that are performed, for example, during preliminary image update, momentum computation, and/or subsequent image update phases of the exemplary method. In the context of software, the blocks represent computer instructions that, when executed by one or more processing subsystems, perform the recited operations.

The order in which the exemplary method is described is not intended to be construed as a limitation, and any number of the described blocks may be combined in any order to implement the exemplary method disclosed herein, or an equivalent alternative method. Additionally, certain blocks may be deleted from the exemplary method or augmented by additional blocks with added functionality without departing from the spirit and scope of the subject matter described herein. For discussion purposes, the exemplary method will be described with reference to the elements of FIGS. 1-2.

Embodiments of the present method allow for substantial reduction in computational costs involved in the iterative image reconstruction. To that end, the present method employs OS and momentum to accelerate the iterative image reconstruction. Particularly, embodiments of the present method use only a subset of the projection data per iteration and one or more momentum terms derived from previous iterations to allow expeditious updates to the image estimates, thereby improving the image reconstruction speed.

For clarity, the present method is described here with reference to use of momentum terms determined using Nesterov's algorithms. However, implementation of the present method is not limited to the specific iterative reconstruction algorithm discussed in this description. In particular, the present method may be used to generate momentum terms, for example, using Aitken's acceleration or Steffensen's method. Further, the present method may be used to improve the performance of several other iterative reconstruction algorithms such as the preconditioned conjugate gradient (PCG) method, the grouped coordinate descent method, and line search methods. Additionally, the present combination of OS and momentum may also be employed for rapid solving of linear systems of equations and other sub-problems arising in image reconstruction algorithms involving variable-splitting and the augmented Lagrangian.

In one embodiment, an imaging system such as the CT system 100 of FIG. 1 or the system 200 of FIG. 2 may be configured to acquire projection data corresponding to a target region of a patient or a manufactured part. An image reconstruction unit such as the image reconstructor 230 of FIG. 2 may generate measured data, for example, sinogram data corresponding to the acquired projection data for use in subsequent image reconstruction. Alternatively, the measured data may correspond to coil data in a magnetic resonance imaging (MRI) scan performed using a multiple coil MRI system. At step 302, the measured data may be received from the imaging system. An iterative image reconstruction algorithm may then use the measured data to reconstruct one or more images of the target region using iterative updates.

Iterative X-ray CT reconstruction entails reconstructing an image $x \in R^{N_p}$ from noisy measurements $y \in R^{N_d}$ by minimizing a cost function $\Psi(x)$:

$$\hat{x} = \text{argmin } \Psi(x).$$

$$x \geq 0 \qquad (1)$$

Equation (1) represents an example of such a cost function $\Psi(x)$, where $\hat{x}$ corresponds to a global (or local) minimizer of $\Psi(x)$, possibly with a non-negativity constraint.

In one embodiment, the cost function $\Psi(x)$ for X-ray CT reconstruction may be based on a convex and continuously differentiable penalized weighted least squares (PWLS) function. The PWLS cost function may be defined, for example, using equation (2):

$$\Psi(x) = \tfrac{1}{2} \|y - Ax\|_W^2 + \beta R(x) \qquad (2)$$

where A corresponds to a projection operator (a matrix that characterizes the imaging system), W corresponds to a diagonal matrix that provides statistical weighting, and R(x) corresponds to a regularization function that may be non-quadratic and differentiable. Further, $\beta$ corresponds to a regularization parameter that balances between the data-fitting term $\tfrac{1}{2}\|y-Ax\|_W^2$ and the regularizer R(x).

However, due to the large-scale and ill conditioning of the CT image reconstruction problem, only certain iterative algorithms are well suited to minimize the cost function $\Psi(x)$. Minimizing the cost function $\Psi(x)$ entails determining a corresponding gradient. In one embodiment, the gradient of the PWLS cost function $\Psi(x)$ may be determined using equation (3):

$$\nabla \Psi(x) = A'W(Ax-y) + \nabla R(x) \qquad (3)$$

where A and A' correspond to forward-projection and back-projection operators, respectively.

Determining the gradient $\nabla \Psi(x)$ of the cost function $\Psi(x)$ using the projection operators A and A', however, is computationally expensive. Accordingly, certain CT systems employ OS algorithms to allow for approximation of the gradient $\nabla \Psi(x)$ using only a subset of measured projection data and a corresponding sub-projection operator. Use of subsets in lieu of the entirety of the measured projection data provides dramatic initial acceleration to the iterative image reconstruction. By way of example, use of the OS-SQS algorithm substantially accelerates the image reconstruction by simplifying the iterative image updates and allowing for substantial parallel computing. Using an NU optimization transfer scheme may further accelerate the OS-SQS and reduce the number of iterations.

Optimization Transfer Method

An optimization transfer method (also known as a majorize-minimize method) replaces the objective function $\Psi(x)$ with a surrogate $\phi(x; x^{(k)})$ at kth iteration that is easier to minimize. An exemplary iteration of optimization transfer is presented in equation (4) representative of Method 1.

Method 1
Initialize image $x^{(0)}$
For k=0, 1, 2, ....
  Form a surrogate function (majorizer) $\phi(x; x^{(k)})$ $$\text{Minimize the surrogate: } x^{(k+1)} = \text{argmin}_{x \geq 0} \phi(x; x^{(k)}) \qquad (4)$$

Generally, the cost function $\Psi(x)$ may be monotonically decreased by using surrogates $\phi(x; x^{(k)})$ that are designed to satisfy one or more determined conditions. The determined conditions, for example, include:

$$\Psi(x^{(k)}) = \phi(x^{(k)}; x^{(k)}), \Psi(x) \leq \phi(x; x^{(k)}), \forall x \in R^{N_p}, x \geq 0 \qquad (5)$$

Although, in a presently contemplated implementation, the surrogates may be designed to strictly satisfy the determined conditions defined using equation (5), in other implementations, one or more other conditions may be employed.

Further, the cost function $\Psi(x)$ may be majorized, for example, using the following quadratic surrogate function $\phi(x; x^{(k)})$:

$$\Psi(x) \leq \phi(x; x^{(k)}) = \Psi(x^{(k)}) + \nabla \Psi(x^{(k)})'(x-x^{(k)}) + \tfrac{1}{2}(x-x^{(k)})'D(x-x^{(k)}) \qquad (6)$$

where often D is designed such that equation (6) satisfies equation (5).

Accordingly, an iteration in equation (4) may be represented using equation (7):

$$x^{(k+1)} = x^{(k)} - D^{-1} \nabla \Psi(x^{(k)}) \qquad (7)$$

where a majorizing matrix D may be derived, for example, using Lipschitz constant, De Pierro's lemma in NU-SQS algorithm, or other methods that yield a matrix that is easier to invert than the Hessian matrix of the original cost function.

The optimization transfer method with a diagonal majorizer D, as described herein, may be shown to have a convergence rate of O(1/k), for example using Theorem 1. Theorem 1—The sequence $\{x^{(k)}\}$ generated by Method 1 satisfies equation (8):

$$\Psi(x^{(k)}) - \Psi(\hat{x}) \leq \frac{\|x^{(0)} - \hat{x}\|_D^2}{2k} \qquad (8)$$

for a diagonal majorizer D, or other invertible majorizing matrices.

The NU approach may accelerate the optimization transfer method, for example, by reducing the numerator $\|x^{(0)} -$ $\hat{x}\|^2_D$ in equation (8) with respect to D in Theorem 1. The order of convergence rate O(1/k) of the NU approach, however, remains the same. Accordingly, embodiments of the present disclosure employ momentum techniques to accelerate the optimization transfer methods for achieving a faster convergence rate, for example, of about $O(1/k^2)$, than conventional image reconstruction methods. Specifically, the NU approach may also be used with momentum-based optimization transfer methods to reduce the number of iterations needed.

Momentum-Based Optimization Transfer Methods

Optimization transfer methods may be accelerated by use of a momentum term. A general outline of use of momentum with optimization transfer methods that extend Method 1 may be represented using equation (9) that corresponds to Method 2.

Method 2
Initialize image $x^{(0)}$, $v^{(0)}$, and $z^{(0)}$
For k=0, 1, 2, . . . .
    Form $\phi(x; x^{(k)})$
    Design $\psi(x; x^{(k)}, v^{(k)}, z^{(k)}, \ldots, x^{(0)}, v^{(0)}, z^{(0)})$
    Choose $\tau_{k+1}$ $$v^{(k+1)} = \mathrm{argmin}_{x \geq 0} \phi(x; x^{(k)})$$

$$z^{(k+1)} = \mathrm{argmin}_{x \geq 0} \psi(x; x^{(k)}, v^{(k)}, z^{(k)}, \ldots, x^{(0)}, v^{(0)}, z^{(0)})$$

$$x^{(k+1)} = (1 - \tau_{k+1})v^{(k+1)} + \tau_{k+1}z^{(k+1)} \quad (9)$$

In the Method 2, the terms $x^{(k)}$, $v^{(k)}$, $z^{(k)}$ correspond to image variables that find use in computing an image estimate in a particular iteration of the image reconstruction method and $\tau_k$ corresponds to a scalar variable to balance the relative weights between $v^{(k)}$ and $z^{(k)}$. Particularly, the term $v^{(k)}$ corresponds to a normal optimization transfer update and $z^{(k)}$ corresponds to the momentum term. The momentum term $Z^{(k)}$ depends on previous iterations $\{x^{(l)}\}_{l=0}^{k-1}$, $\{v^{(l)}\}_{l=0}^{k-1}$ and $\{z^{(l)}\}_{l=0}^{k-1}$, thereby allowing the iterates to converge faster. Further, the parameter $\tau_k$ controls the balance between $v^{(k)}$ and $z^{(k)}$, and may be any real number. Moreover, $x^{(k)}$ may lie in a feasible region (for example, a non-negative orthant in equation (1)) if $\tau_k$ has values within [0 1]. The Method 2 reduces to the Method 1 when $\tau_k = 0$ for all k.

Different versions of the Method 2 that converge at a rate of about $O(1/k^2)$ are described in greater detail in the following sections. For discussion purposes, three different versions of the Method 2 are discussed with reference to conventional Nesterov's methods. The three exemplary versions described herein vary in the way the momentum terms are determined, for example, using image variables from a single previous iteration or all of the previous iterations.

Version 1

Version 1 of Nesterov's methods provides the momentum term by using an image estimate from a single previous iteration and may be represented using equations (10) and (11):

$$\psi(x; x^{(k)}, v^{(k)}, z^{(k)}, \ldots, x^{(0)}, v^{(0)}, z^{(0)}) = \phi(x; x^{(k-1)}) \quad (10)$$

$$\tau_{k+1} = \frac{1 - t_k}{t_{k+1}}, \text{ where } t_0 \geq 1 \text{ and } t_{k+1}^2\left(1 - \frac{1}{t_{k+1}}\right) \leq t_k^2 \quad (11)$$

An iterative algorithm based on applying momentum to optimization transfer that uses equations (10) and (11) may be represented, for example, using Method 3. In one embodiment, the choice of $t_k$ in Method 3 is the fastest increasing $t_k$ among all choices that satisfy equation (11) starting from $t_0 = 1$, thereby providing faster convergence.

Method 3
Initialize image $x^{(0)} = y^{(0)}$, $t^{(0)} = 1$
For k=0, 1, 2, . . .

$$\tau_{k+1} = \frac{1 - t_k}{t_{k+1}} \text{ and } t_{k+1} = \frac{1 + \sqrt{1 + 4t_k^2}}{2} \quad (12)$$

$$v^{(k+1)} = [x^{(k)} - D^{-1}\nabla\Psi(x^{(k)})]_+$$

$$z^{(k+1)} = v^{(k)}$$

$$x^{(k+1)} = (1 - \tau_{k+1})v^{(k+1)} + \tau_{k+1}z^{(k+1)}$$

Method 3 is convergent as stated by Theorem 2, where the sequence $\{v^{(k)}\}$ converges with a rate of $O(1/k^2)$.

Theorem 2—The sequence $\{v^{(k)}\}$ generated by the Method 3 satisfies equation (13):

$$\Psi(v^{(k)}) - \Psi(\hat{x}) \leq \frac{2\|v^{(0)} - \hat{x}\|_D^2}{(k+1)^2} \quad (25)$$

Version 2

Version 2 of Nesterov's methods provides the momentum term by using the image $z^{(k)}$ from a previous iteration and may be represented using equations (14) and (15):

$$\psi(x; x^{(k)}, v^{(k)}, z^{(k)}, \ldots, x^{(0)}, v^{(0)}, z^{(0)}) = \quad (14)$$
$$\Psi(x^{(k)}) + \nabla\Psi(x^{(k)})'(x - x^{(k)}) + \tau_{k+1}\frac{1}{2}(x - z^{(k)})'D(x - z^{(k)})$$

$$\tau_{k+1} = \frac{1}{t_{k+1}}, \text{ where } t_0 \geq 1 \text{ and } t_{k+1}^2\left(1 - \frac{1}{t_{k+1}}\right) \leq t_k^2 \quad (15)$$

An iterative algorithm based on applying momentum to optimization transfer using equations (14) and (15) may be represented using Method 4. In one embodiment, the choice of $t_k$ in Method 4 is the fastest increasing $t_k$ among all choices satisfying equation (15) starting from $t_0 = 1$, thereby providing faster convergence.

Method 4
Initialize image $x^{(0)}$, $v^{(0)}$, $z^{(0)}$, and $t_0 = 1$
For k=0, 1, 2, . . .

$$\tau_{k+1} = \frac{1}{t_{k+1}} \text{ and } t_{k+1} = \frac{1 + \sqrt{1 + 4t_k^2}}{2} \quad (16)$$

$$v^{(k+1)} = [x^{(k)} - D^{-1}\nabla\Psi(x^{(k)})]_+$$

$$z^{(k+1)} = [z^{(k)} - t_{k+1}D^{-1}\nabla\Psi(x^{(k)})]_+$$

$$x^{(k+1)} = (1 - \tau_{k+1})v^{(k+1)} + \tau_{k+1}z^{(k+1)}$$

Method 4 is also convergent, where the sequence $\{v^{(k)}\}$ converges at the rate of rate $O(1/k^2)$. In a variation of Method 4, the optimization transfer iteration $v^{(k+1)}$ may be replaced by equation (17):

$$x^{(k+1)} = (1 - \tau_k)v^{(k)} + \tau_k z^{(k+1)} \quad (17)$$

which suggests that the convergence rate $O(1/k^2)$ may be achieved without using an optimization transfer inner step.

Version 3

Version 3 of Nesterov's methods provides the momentum term by using image estimates from all previous iterations and may be represented using equations (18) and (19):

$$\psi(x; x^{(k)}, v^{(k)}, z^{(k)}, \ldots, x^{(0)}, v^{(0)}, z^{(0)}) = \qquad (18)$$
$$\sum_{l=0}^{k} t_l [\Psi(x^{(l)}) + \nabla \Psi(x^{(l)})'(x - x^{(l)})] + \frac{1}{2}(x - x^{(0)})' D(x - x^{(0)})$$

$$\tau_{k+1} = \frac{t_{k+1}}{\sum_{l=0}^{k+1} t_l}, \text{ where } t_0 \in (0\ 1] \text{ and } t_{k+1}^2 \le \sum_{l=0}^{k+1} t_l \qquad (19)$$

An iterative algorithm based on applying momentum to optimization transfer in equations (18) and (19) may be represented using Method 5. In one embodiment, the choice of $t_k$ in Method 5 is the fastest increasing $t_k$ among all choices satisfying (19) starting from $t_0=1$, thereby providing faster convergence.

Method 5
Initialize image $x^{(0)}$, $v^{(0)}$, $z^{(0)}$, and $t_0=1$
For k=0, 1, 2, . . .

$$\tau_{k+1} = \frac{t_{k+1}}{\sum_{l=0}^{k+1} t_l} \text{ and } t_{k+1} = \frac{1 + \sqrt{1 + 4t_k^2}}{2} \qquad (20)$$

$$v^{(k+1)} = [x^{(k)} - D^{-1} \nabla \Psi(x^{(k)})]_+$$

$$z^{(k+1)} = \left[ x^{(0)} - D^{-1} \sum_{l=0}^{k} t_l \nabla \Psi(x^{(l)}) \right]_+$$

$$x^{(k+1)} = (1 - \tau_{k+1}) v^{(k+1)} + \tau_{k+1} z^{(k+1)}$$

Method 5 is convergent as stated by Theorem 3, where sequence $\{v^{(k)}\}$ converges at a rate of $O(1/k^2)$.

Theorem 3—The sequence $\{v^{(k)}\}$ generated by the Method 5 satisfies equation (21):

$$\Psi(v^{(k)}) - \Psi(\hat{x}) \le \frac{2\|v^{(0)} - \hat{x}\|_D^2}{(k+1)(k+2)} \qquad (21)$$

As previously noted, even though Nesterov's momentum methods have been used in various optimization problems, the conventional Nesterov's methods have used a Lipschitz constant for the cost function $\Psi(x)$. However, for X-ray CT, computing the (smallest) Lipschitz constant may entail extensive computations. Accordingly, the conventional Nesterov approach is poorly suited to X-ray CT reconstruction in practical settings such as in a hospital. In contrast, in the present disclosure, a combination of optimization transfer (for example, SQS, which replaces the ill-suited Lipschitz constant with a suitable diagonal matrix D) and momentum may be used to achieve faster convergence of the conventional momentum methods such as Nesterov's methods. Furthermore, as conventional momentum-based optimization transfer methods are slow due to either a large Lipschitz constant or a large (diagonal) majorizer D for the X-ray CT cost function $\Psi(x)$, embodiments of the present disclosure apply OS methods to momentum-based optimization transfer to achieve faster convergence. The OS methods are briefly described in the following section.

Ordered Subsets (OS)-Based Method

The OS-based iterative image reconstruction uses only a subset of the projection data per iteration, thereby substantially reducing the computational effort and/or memory access involved in the iterative image reconstruction. In the OS-based image reconstruction, the cost function $\Psi(x)$ may be written as $\Psi(x) = \sum_{m=0}^{M-1} \Psi_m(x)$ where $\Psi_m(x)$ is defined in equation (22):

$$\Psi_m(x) = \frac{1}{2} \|y_m - A_m x\|_{W_m}^2 + \frac{\beta}{M} R(x) \qquad (22)$$

and is a function of mth subset of measurement data, M is a number of subsets. $A_m$, $y_m$ and $W_m$ are submatrices of A, y and W, respectively that correspond to the mth subset of measured data.

Although the present embodiment describes use of the OS for image reconstruction, it may be noted that, as used herein, reference to the terms "ordered subsets" or "OS" is not restricted to indicate a specific ordering typically used in tomographic imaging. The terms "ordered subsets" or "OS" may be used to refer to different ordering of subsets. For example, in some embodiments, the terms "ordered subsets" or "OS" may additionally be used to refer to random orders such as those used in some stochastic subgradient algorithms.

In one embodiment employing OS-based methods, the following approximation defined in equation (23) may be used:

$$\nabla \Psi(x) \approx M \nabla \Psi_0(x) \approx M \nabla \Psi_1(x) \approx \ldots \approx M \nabla \Psi_{M-1}(x) \qquad (23)$$

when each subset includes measurement data (for example, projection views) that are approximately uniformly downsampled by M.

Based on the approximation defined in equation (23), gradient function $\nabla \Psi(x^{(k)})$ may be replaced by subset-gradient function $M \nabla \Psi_m(x^{(k)})$ (or with similar approximations) in the Methods 1, 2, 3, 4 and 5. Use of the OS-based method allows for approximation of the original gradient of the cost function $\nabla \Psi(x^{(k)})$ with only 1/M of the amount of computation by using a subset of measured sinogram data. The OS-based methods, thus, may allow for up to M times acceleration in early iterations of image reconstruction.

Accordingly, at step 304, a preliminary image update in a particular iteration is determined based on one or more image variables. The image variables may be computed using at least a subset of the measured data in the particular iteration. For example, the preliminary image update may be determined using equations (22) and/or (23). Specifically, in one embodiment, the preliminary image update may be determined using Method 6 represented by equation (24) defined herein:

Method 6
Initialize image $x^{(0)}$
For k=0, 1, 2, . . . .
 For m=0, 1, . . . , M−1
  Form a surrogate function (majorizer)

$$\phi_m\left(x; x^{(k+\frac{m}{M})}\right)$$

Minimize the surrogate:

$$x^{(k+\frac{m+1}{M})} = \operatorname{argmin}_{x \geq 0} \phi_m(x; x^{(k+\frac{m}{M})}) \quad (24)$$

In one embodiment, the function $$\phi_m(x; x^{(k+\frac{m}{M})})$$

may be defined using equation (25) that represents an approximation of a surrogate $$\phi(x; x^{(k+\frac{m}{M})})$$

in equation (6).

$$\phi_m(x; x^{(k+\frac{m}{M})}) = M\Psi_m(x^{(k+\frac{m}{M})}) + \quad (25)$$
$$M\nabla\Psi_m(x^{(k+\frac{m}{M})})'(x - x^{(k+\frac{m}{M})}) + \frac{1}{2}(x - x^{(k+\frac{m}{M})})' D(x - x^{(k+\frac{m}{M})})$$

Method 6 generates a sequence $$\{x^{(k+\frac{m}{M})}\}.$$

Each mth sub-iteration in the OS-based Method 6 is counted as 1/M iteration as it uses approximately only 1/M of the amount of computation as compared to the computations involved in a corresponding iteration of the Method 1. However, the approximation defined in equation (23) may progressively become inaccurate as the iterates approach the minimizer or the solution image, and the OS-based methods lose the convergence property.

Accordingly, in the present disclosure, the OS-based methods are combined with momentum terms determined using customized Nesterov's methods to achieve a fast convergence rate $O(1/(kM)^2)$ in early iterations. Particularly, the OS and momentum-based method provides substantially more acceleration to iterative image reconstruction that is available through either of these techniques used alone.

An outline of optimization transfer using OS and momentum may be represented using Method 7 that extends Method 2 as shown herein in equation (26).
Method 7
Initialize image $x^{(0)}$, $v^{(0)}$ and $z^{(0)}$
For k=0, 1, 2, . . . .
For m=0, 1, . . . , M-1

$$\text{Form } \phi_m(x; x^{(k+\frac{m}{M})}) \quad (26)$$
$$\text{Design } \psi_m(x; x^{(k+\frac{m}{M})}, v^{(k+\frac{m}{M})}, z^{(k+\frac{m}{M})}, \ldots, x^{(0)}, v^{(0)}, z^{(0)})$$
$$\text{Choose } \tau_{kM+m+1}$$
$$v^{(k+\frac{m+1}{M})} = \operatorname{argmin}_{x \geq 0} \phi_m(x; x^{(k+\frac{m}{M})})$$
$$z^{(k+\frac{m+1}{M})} =$$

-continued
$$\operatorname{argmin}_{x \geq 0} \psi_m(x; x^{(k+\frac{m}{M})}, v^{(k+\frac{m}{M})}, z^{(k+\frac{m}{M})}, \ldots, x^{(0)}, v^{(0)}, z^{(0)})$$
$$x^{(k+\frac{m+1}{M})} = (1 - \tau_{kM+m+1})v^{(k+\frac{m+1}{M})} + \tau_{kM+m+1} z^{(k+\frac{m+1}{M})}$$

OS-based methods using momentum provide substantial initial acceleration to allow the iterative image reconstruction to converge to a desired optimum. Additionally, the acceleration provided by one or more momentum terms allows use of fewer subsets (smaller M) than with standard OS methods, thus providing greater stability to the OS and momentum-based optimization transfer method.

Further, at step 306, at least one momentum term is determined based on one or more image variables computed in the particular iteration and/or one or more further image variables computed in one or more iterations preceding the particular iteration. In one embodiment, coefficients of the one or more image variables may be determined in each iteration using customized momentum-based methods such as Nesterov's algorithms. The customized momentum-based methods may be designed to aid in accelerating convergence of an image reconstruction method in a determined number of iterations.

In a presently contemplated embodiment, the OS and momentum-based methods may generate the momentum terms, for example, by iteratively determining a linear combination of the one or more image variables, whose coefficients change in each iteration. Specifically, in one embodiment, iteratively determining the linear combination may include determining linear combinations of gradients of cost functions evaluated at the one or more further image variables computed in one or more iterations preceding the particular iteration, where the cost function corresponds to at least the subset of the measured data.

For discussion purposes, three exemplary versions of the OS and momentum-based methods are described by defining an approximate surrogate function $\psi_m(x; \bullet)$ using the approximation defined in equation (23). The following three versions present extensions to Methods 3, 4, and 5, respectively.

Version 1—(OS-MOM-1)

In Version 1, the OS approach is combined with Nesterov's first algorithm to provide the momentum term using an image estimate from a single previous iteration. Version 1 of the OS and momentum-based method may be represented using equations (27) and (28):

$$\psi_m(x; x^{(k+\frac{m}{M})}, \ldots, z^{(0)}) = \phi_{m-1}(x; x^{(k+\frac{m-1}{M})}) \quad (27)$$

$$\tau_{k+1} = \frac{1-t_k}{t_{k+1}}, \text{ where } t_0 \geq 1 \text{ and } t_{k+1}^2\left(1 - \frac{1}{t_{k+1}}\right) \leq t_k^2 \quad (28)$$

An outline of an iterative algorithm using Version 1 of the combined OS and momentum-based method may be represented using Method 8. In one embodiment, the choice of $t_k$ in Method 8 is the fastest increasing $t_k$ among all choices satisfying equation (28) starting from $t_0=1$, thereby providing faster convergence in early iterations.
Method 8
Initialize image $x^{(0)}$, $v^{(0)}$, $z^{(0)}$, and $t_0=1$
For k=0, 1, 2, . . . .
For m=0, 1, . . . , M-1

$$\tau_{kM+m+1} = \frac{1 - t_{kM+m}}{t_{kM+m+1}} \text{ and } t_{kM+m+1} = \frac{1 + \sqrt{1 + 4t_{kM+m}^2}}{2} \quad (29)$$

$$v^{(k+\frac{m+1}{M})} = \left[x^{(k+\frac{m}{M})} - D^{-1}M\nabla\Psi_m(x^{(k+\frac{m}{M})})\right]_+$$

$$z^{(k+\frac{m+1}{M})} = v^{(k+\frac{m}{M})}$$

$$x^{(k+\frac{m+1}{M})} = (1 - \tau_{kM+m+1})v^{(k+\frac{m+1}{M})} + \tau_{kM+m+1}z^{(k+\frac{m+1}{M})}$$

Version 2—(OS-MOM-2)

Further, Version 2 of the OS- and momentum-based method may be represented using equations (30) and (31):

$$\psi_m(x; x^{(k+\frac{m}{M})}, \ldots, z^{(0)}) = \quad (30)$$
$$M\Psi_m(x^{(k+\frac{m}{M})}) + M\nabla\Psi_m(x^{(k+\frac{m}{M})})'(x - x^{(k+\frac{m}{M})}) +$$
$$\tau_{kM+m+1}\frac{1}{2}(x - z^{(k+\frac{m}{M})})'D(x - z^{(k+\frac{m}{M})})$$

$$\tau_{k+1} = \frac{1}{t_{k+1}}, \text{ where } t_0 \geq 1 \text{ and } t_{k+1}^2\left(1 - \frac{1}{t_{k+1}}\right) \leq t_k^2 \quad (31)$$

An outline of an iterative algorithm using Version 2 of the combined OS and momentum-based method may be represented using Method 9. In one embodiment, the choice of $t_k$ in Method 8 is the fastest increasing $t_k$ among all choices satisfying equation (31) starting from $t_0=1$, thereby providing faster convergence in early iterations.

Method 9
Initialize image $x^{(0)}$, $v^{(0)}$, $z^{(0)}$, and $t_0=1$
For k=0, 1, 2, . . . .
For m=0, 1, . . . , M−1

$$\tau_{kM+m+1} = \frac{1}{t_{kM+m+1}} \text{ and } t_{kM+m+1} = \frac{1 + \sqrt{1 + 4t_{kM+m}^2}}{2} \quad (32)$$

$$v^{(k+\frac{m+1}{M})} = \left[x^{(k+\frac{m}{M})} - D^{-1}M\nabla\Psi_m(x^{(k+\frac{m}{M})})\right]_+$$

$$z^{(k+\frac{m+1}{M})} = \left[z^{(k+\frac{m}{M})} - t_{kM+m+1}D^{-1}M\nabla\Psi_m(x^{(k+\frac{m}{M})})\right]_+$$

$$x^{(k+\frac{m+1}{M})} = (1 - \tau_{kM+m+1})v^{(k+\frac{m+1}{M})} + \tau_{kM+m+1}z^{(k+\frac{m+1}{M})}$$

Version 3—(OS-MOM-3)

Further, Version 3 of the combined OS- and momentum-based method may be represented using equations (33) and (34):

$$\psi_m(x; x^{(k+\frac{m}{M})}, \ldots, z^{(0)}) = \quad (33)$$
$$\sum_{l=0}^{kM+m} t_l[M\Psi_{l \bmod M}(x^{(\frac{l}{M})}) + M\nabla\Psi_{l \bmod M}(x^{(\frac{l}{M})})'(x - x^{(\frac{l}{M})})] +$$
$$\frac{1}{2}(x - x^{(0)})'D(x - x^{(0)})$$

$$\tau_{k+1} = \frac{t_{k+1}}{\sum_{l=0}^{k+1} t_l}, \text{ where } t_0 \in (0, 1], t_{k+1}^2 \leq \sum_{l=0}^{k+1} t_l \quad (34)$$

An outline of an iterative algorithm using Version 3 of the combined OS- and momentum-based method may be represented using Method 10. In one embodiment, the choice of $t_k$ in Method 8 is the fastest increasing $t_k$ among all choices satisfying equation (34) starting from $t_0=1$, thereby providing faster convergence in early iterations.

Method 10
Initialize image $x^{(0)}$, $v^{(0)}$, $z^{(0)}$, and $t_0=1$
For k=0, 1, 2, . . . .
For m=0, 1, . . . , M−1

$$\tau_{kM+m+1} = \frac{t_{kM+m+1}}{\sum_{l=0}^{kM+m+1} t_l} \text{ and } t_{kM+m+1} = \frac{1 + \sqrt{1 + 4t_{kM+m}^2}}{2} \quad (35)$$

$$v^{(k+\frac{m+1}{M})} = \left[x^{(k+\frac{m}{M})} - D^{-1}M\nabla\Psi_m(x^{(k+\frac{m}{M})})\right]_+$$

$$z^{(k+\frac{m+1}{M})} = \left[z^{(0)} - D^{-1}\sum_{l=0}^{kM+m} t_l M\nabla\Psi_{l \bmod M}(x^{(\frac{l}{M})})\right]_+$$

$$x^{(k+\frac{m+1}{M})} = (1 - \tau_{kM+m+1})v^{(k+\frac{m+1}{M})} + \tau_{kM+m+1}z^{(k+\frac{m+1}{M})}$$

At step 308, one of the Methods 8, 9 or 10 (or similar methods) may be used to determine a subsequent image update using the preliminary image update and the momentum term determined using one or more of the three versions described with reference to step 306. Further, in accordance with aspects of the present disclosure, the OS- and momentum-based methods iteratively compute the preliminary image update, and/or the subsequent image update for a plurality of iterations until one or more termination criteria are satisfied, as depicted by step 310.

In one embodiment, the OS- and momentum-based method may terminate following a determined number of iterations, for example, after ten iterations. Alternatively, the OS and momentum-based method may be determined to converge if the difference between a subsequent image update in a particular iteration and a preceding iteration is less than a determined threshold, for example, 1 Hounsfield Unit (HU). The determined number of iteration and/or the determined threshold may be pre-programmed into the imaging system or may be received from a user. The OS and momentum-based method may subsequently terminate.

The present disclosure describes embodiments of the combined OS and momentum-based method that employs momentum terms determined using Nesterov's methods for substantially accelerating the iterative image reconstruction. The present method, however, may be further extended to handle any majorizers (for example, optimization transfer techniques such as SQS) including those based on line search schemes. In one embodiment, the present method may also be extended to include other linear combinations of one or more image variables $$v^{(k+\frac{m}{M})}$$

and $$z^{(k+\frac{m}{M})}$$

for the update of $$x^{(k+\frac{m}{M})}$$

in the momentum-based optimization transfer methods. In certain embodiments, the present method may be generalized to include other constraints, for example, box constraints, on the reconstruction. Furthermore, non-differentiable functions can be used as a cost function with a smoothing technique or other approaches that handle non-differentiable functions. Additionally, certain other OS-type algorithms such as incremental optimization transfer or relaxed variants of OS may be employed instead of ordinary OS algorithms for achieving faster convergence of the iterative image reconstruction via the use of momentum terms.

Exemplary convergence rates achieved via use of certain conventional methods and embodiments of the present method are discussed with reference to FIGS. 4-6. For the embodiments illustrated in FIGS. 4-6, 3D helical X-ray CT data set of a human shoulder was acquired to depict exemplary acceleration achieved by embodiments of the present method in comparison to conventional image reconstruction methods. The convergence rate is ascertained, for example, by computing the root mean square difference (RMSD) between a current and converged image within the region-of-interest (ROI) in Hounsfield Units (HU) versus number of iterations. In one example, the RMSD is computed using equation (36).

$$RMSD = \frac{\|x_{ROI}^{(n)} - \hat{x}_{ROI}\|}{\sqrt{N_{p,ROI}}}[HU] \quad (36)$$

where $N_{p,ROI}$ is the number of voxels within ROI.

Figure 4:
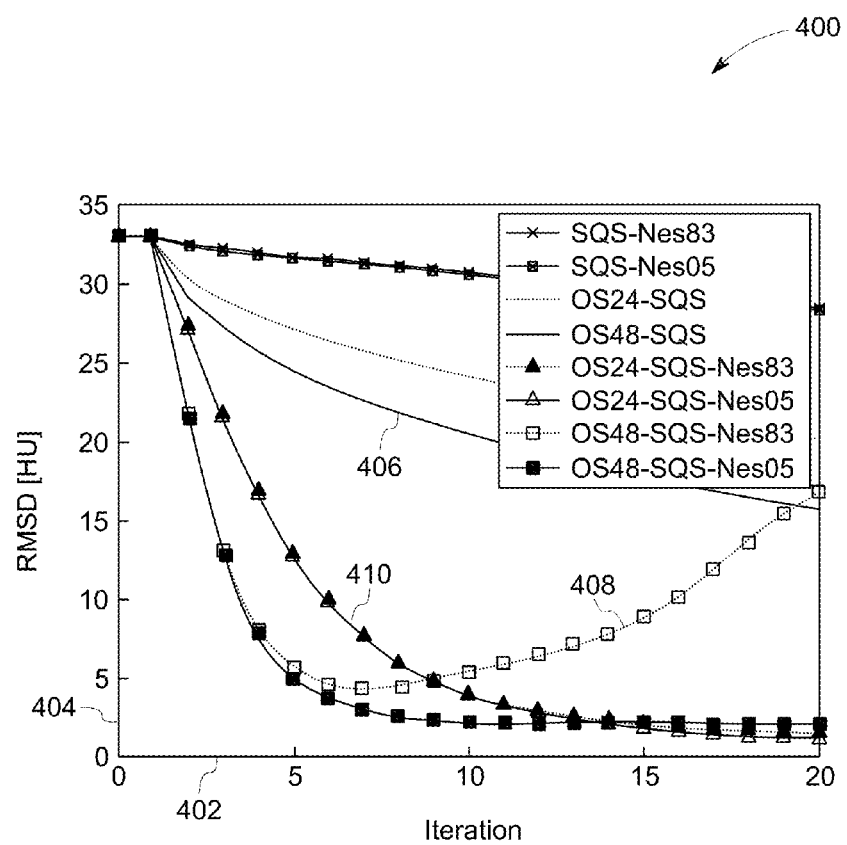
FIG. 4 is a graphical representation depicting exemplary convergence rates of certain image reconstruction methods with and without use of momentum, in accordance with aspects of the present disclosure.

FIG. 4 is a graphical representation 400 depicting exemplary convergence rates of certain image reconstruction methods with and without the use of momentum. In the graphical representation 400, the horizontal axis 402 corresponds to number of iterations and the vertical axis 404 corresponds to the root mean standard deviation (RMSD). The RMSD corresponds to the remaining error in image reconstruction. Thus, sharper the decrease in a curve, greater is the convergence rate of the corresponding image reconstruction method.

FIG. 4 illustrates, for example, curves corresponding to a conventional OS-SQS-based method (see element 406), OS-SQS-based method employing the momentum terms determined using Version 1 or the Method 3 (hereinafter "MOM-1", see element 408), and OS-SQS-based method employing the momentum terms determined using Version 3 or the Method 5 (hereinafter "MOM-3", see element 410).

In the embodiment depicted in FIG. 4, different number of subsets, for example, 1, 24, and 48 are employed. As evident from the depictions of FIG. 4, use of the momentum terms in the OS-based methods (see elements 408 and 410) provide substantially more acceleration than conventional image reconstruction methods (see element 406). As evident from the depiction of FIG. 4, combinations of OS-based methods with Version 1(OS-MOM-1) and Version 3 behave differently. Specifically, in the embodiment illustrated in FIG. 4, use of Version 3 with OS-based method appears to provide more stable performance.

Further, FIG. 5 illustrates another graphical representation 500 depicting exemplary convergence rates of certain image reconstruction methods with and without the use of momentum. FIG. 5 illustrates curves representative of exemplary convergence rates of the various image reconstruction methods. Certain curves correspond to image reconstruction methods that employ a NU-OS-SQS-based method using MOM-3 with different number of subsets. As evident from the depictions of FIG. 5, use of the NU approach provides substantial initial acceleration.

FIG. 6 is a diagrammatical representation 600 depicting examples of initial images and corresponding converged images reconstructed using certain image reconstruction methods with or without the use of momentum. Particularly, FIG. 6 illustrates an initial filtered back projection (FBP) image $x^{(o)}$ 602 and a corresponding converged image $\hat{x}$ 604 for use as a reference. FIG. 6 further illustrates images reconstructed at 12th iteration from four different image reconstruction methods for comparison. As evident from the depictions of FIG. 6, use of the momentum term greatly accelerates convergence. Particularly, the combination of NU and momentum with OS-based methods provides a converged image 606 having image quality substantially similar to the reference image 604 in only a few iterations.

Embodiments of the present disclosure, thus, provide methods and systems for accelerating iterative image reconstruction. The embodiments described herein allow for substantial reduction in computational costs involved in the iterative image reconstruction through use of OS and momentum. Particularly, the present method uses a relatively small number of OS of the projection data per iteration and one or more momentum terms derived from previous iterations to allow expeditious updates to the image estimates, thereby improving the image reconstruction speed. Faster image reconstruction may circumvent a need for multiple scans and/or surgical intervention to assess a medical condition of a patient, thereby allowing for real-time diagnoses and providing substantial savings in computational effort and/or medical resources. Additionally, faster image reconstruction encourages wider use of iterative reconstruction methods, thereby enabling use of more low-dose CT scans.

Although the present disclosure is described here with reference to use of OS and momentum terms determined using Nesterov's algorithm, in certain embodiments, other suitable algorithms and methods may be employed. For example, Aitken's acceleration or Steffensen's method may be used to determine momentum terms for use in accelerating the convergence of an iterative image reconstruction algorithm. The momentum terms may then be used to improve the performance of several other iterative reconstruction algorithms such as the PCG method, the grouped coordinate descent method, and line search methods. Additionally, embodiments of the present disclosure may find use in providing fast and accurate image reconstruction for both medical and non-medical imaging applications.

It may be noted that the foregoing examples, configurations, and method steps that may be performed by certain components of the present systems may be implemented by suitable code on a processor-based system. These components, for example, may include the control mechanism 208, the DAS 214, the computing device 216, and/or the image reconstructor 230 of FIG. 2. Particularly, the steps may be performed using a special-purpose computer, multi-core CPU architecture, distributed cluster systems, general purpose graphical processor unit (GPU) architecture, and/or cloud-based systems. It may also be noted that different implementations of the present disclosure may perform some or all of the steps described herein in different orders or substantially concurrently, that is, in parallel.

Additionally, the functions may be implemented in a variety of programming languages, including but not limited to Ruby, Hypertext Preprocessor (PHP), Perl, Delphi, Python, Matlab, Freemat, Octave, Interactive Data Language (IDL), FORTRAN, Cuda, openCL, C, C++, and/or Java. Such code may be stored or adapted for storage on one or more tangible, machine-readable media, such as on data repository chips, local or remote hard disks, optical disks (that is, CDs or DVDs), solid-state drives, or other media, which may be accessed by the processor-based system to execute the stored code.

Although specific features of various embodiments of the present disclosure may be shown in and/or described with respect to some drawings and not in others, this is for convenience only. It is to be understood that the described features, structures, and/or characteristics may be combined and/or used interchangeably in any suitable manner in the various embodiments While only certain features of the present disclosure have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for image reconstruction, comprising:
receiving measured data from an imaging system;
determining a preliminary image update in a particular iteration of a plurality of iterations based on one or more current image variables computed using one or more subsets of the measured data in the particular iteration;
determining at least one momentum term using the one or more current image variables computed in the particular iteration, one or more further image variables computed in one or more iterations preceding the particular iteration, or a combination thereof, based on a convergence rate, wherein the convergence rate is $O(I/(mk)^2)$, and wherein k represents a number of the plurality of iterations and m represents a number of the one or more subsets of the measured data;
replacing a Lipschitz constant in the at least one momentum term with a suitable diagonal majorizer;
determining a subsequent image update using the preliminary image update and the at least one momentum term with the suitable diagonal majorizer; and
iteratively computing the preliminary image update, the subsequent image update, or a combination thereof, for the plurality of iterations until one or more termination criteria are satisfied.

2. The method of claim 1, wherein iteratively computing the preliminary image update, the subsequent image update, or a combination thereof, comprises computing a gradient of a cost function corresponding to the one or more subsets of the measured data using an ordered subsets algorithm.

3. The method of claim 1, wherein iteratively computing the preliminary image update, the subsequent image update, or a combination thereof, comprises using a gradient of a cost function corresponding to the one or more subsets of the measured data, using accumulated weighted gradients of cost functions evaluated at the one or more further image variables computed in the one or more iterations preceding the particular iteration, or a combination thereof.

4. The method of claim 1, wherein determining the at least one momentum term comprises iteratively determining a linear combination of the one or more current image variables, the one or more further image variables, or a combination thereof, and wherein coefficients of the one or more current image variables, the one or more further image variables, or a combination thereof, change in each of the plurality of iterations.

5. The method of claim 4, wherein iteratively determining the linear combination comprises determining one or more linear combinations of gradients of a cost function computed in the one or more iterations preceding the particular iteration, and wherein the cost function corresponds to the one or more subsets of the measured data.

6. The method of claim 4, further comprising determining the coefficients of the one or more current image variables, the one or more further image variables, or a combination thereof, in each of the plurality of iterations using Nesterov's algorithm.

7. The method of claim 4, wherein the coefficients are determined based on the number of plurality of iterations.

8. The method of claim 1, wherein determining the at least one momentum term comprises using the one or more further image variables computed in a single iteration preceding the particular iteration.

9. The method of claim 1, wherein determining the at least one momentum term comprises using the one or more current image variables, the one or more further image variables, or a combination thereof, computed in all iterations preceding the particular iteration.

10. The method of claim 1, wherein the one or more subsets of the measured data comprise one or more subsets of projection views in a sinogram corresponding to a subject.

11. The method of claim 1, wherein the one or more subsets of the measured data comprise one or more subsets of coil data in a magnetic resonance imaging scan performed using a magnetic resonance imaging system comprising a plurality of coils.

12. The method of claim 1, further comprising reconstructing an image corresponding to at least a portion of a subject using the preliminary image update, the subsequent image update, or a combination thereof.

13. The method of claim 1, further comprising solving linear systems of equations, sub-problems arising in algorithms involving variable-splitting and augmented Lagrangian, or a combination thereof, using the method for image reconstruction.

14. An imaging system, comprising:
an image processing unit configured to:
receive measured data corresponding to a subject;
determine a preliminary image update in a particular iteration of a plurality of iterations based on one or more current image variables computed using one or more subsets of the measured data in the particular iteration;
determine at least one momentum term using the one or more current image variables computed in the particular iteration, one or more further image variables computed in one or more iterations preceding the particular iteration, or a combination thereof, based on a convergence rate, wherein the convergence rate is $O(I/(mk)^2)$, and wherein k represents a number of the plurality of the iterations and m represents a number of the one or more subsets of the measured data;
replace a Lipschitz constant in the at least one momentum term with a suitable diagonal majorizer;
determine a subsequent image update using the preliminary image update and the at least one momentum term with the suitable diagonal majorizer; and
iteratively compute the preliminary image update, the subsequent image update, or a combination thereof, for the plurality of iterations until one or more termination criteria are satisfied.

15. The imaging system of claim 14, wherein the imaging system comprises a computed tomography system, a single source imaging system, a multi-source imaging system, a multi-detector imaging system, a photon counting and energy discriminating detector imaging system, an X-Ray system, a positron emission tomography scanner, a single photon emission computed tomography scanner, or combinations thereof.

16. A computed tomography (CT) system, comprising:
  at least one radiation source configured to generate X-rays at a plurality of energy levels to image a subject;
  a detector assembly operatively coupled to the at least one radiation source and configured to detect the X-rays;
  an image processing unit operatively coupled to the detector assembly and configured to:
    receive measured data corresponding to the subject, wherein the measured data is generated based on the detected X-rays;
    determine a preliminary image update in a particular iteration of a plurality of iterations based on one or more current image variables computed using one or more subsets of the measured data in the particular iteration;
    determine at least one momentum term using the one or more current image variables computed in the particular iteration, one or more further image variables computed in one or more iterations preceding the particular iteration, or a combination thereof, based on a convergence rate, wherein the convergence rate is $O(I/(mk)^2)$, and wherein k represents a number of the plurality of the iterations and m represents a number of the one or more subsets of the measured data;
    replace a Lipschitz constant in the at least one momentum term with a suitable diagonal majorizer;
    determine a subsequent image update using the preliminary image update and the at least one momentum term with the suitable diagonal majorizer; and
    iteratively compute the preliminary image update, the subsequent image update, or a combination thereof, for the plurality of iterations until one or more termination criteria are satisfied.

17. A non-transitory computer readable medium that stores instructions executable by one or more processors to perform a method for image reconstruction, comprising:
  receiving measured data corresponding to a subject;
  determining a preliminary image update in a particular iteration of a plurality of iterations based on one or more current image variables computed using one or more subsets of the measured data in the particular iteration;
  determining at least one momentum term using the one or more current image variables computed in the particular iteration, one or more further image variables computed in one or more iterations preceding the particular iteration, or a combination thereof based on a convergence rate of the method for image reconstruction, wherein the convergence rate is $O(I/(mk)^2)$, and wherein k represents a number of the plurality of iterations and m represents a number of the one or more subsets of the measured data;
  replacing a Lipschitz constant in the at least one momentum term with a suitable diagonal majorizer;
  determining a subsequent image update using the preliminary image update and the at least one momentum term with the suitable diagonal majorizer; and
  iteratively computing the preliminary image update, the subsequent image update, or a combination thereof, for the plurality of iterations until one or more termination criteria are satisfied.

18. The non-transitory computer readable medium of claim 17, wherein iteratively computing the preliminary image update, the subsequent image update, or a combination thereof, comprises using accumulated weighted gradients of cost functions evaluated at the one or more further image variables computed in the one or more iterations preceding the particular iteration.

19. The non-transitory computer readable medium of claim 17, wherein the method further comprises determining coefficients of the one or more current image variables in each of the plurality of iterations using Nesterov's algorithm.

20. The non-transitory computer readable medium of claim 17, wherein determining the at least one momentum term comprises using the one or more current image variables, the one or more further image variables, computed in all iterations preceding the particular iteration, or a combination thereof.

* * * * *